US012044192B2

(12) United States Patent
Johnson et al.

(10) Patent No.: US 12,044,192 B2
(45) Date of Patent: Jul. 23, 2024

(54) AIR INTAKE PORT FOR A LEAN-BURN GASOLINE ENGINE

(71) Applicant: JAGUAR LAND ROVER LIMITED, Warwickshire (GB)

(72) Inventors: Jack Johnson, Coventry (GB); Lyn McWilliam, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 18/283,881

(22) PCT Filed: Mar. 26, 2021

(86) PCT No.: PCT/EP2021/057926
§ 371 (c)(1),
(2) Date: Sep. 25, 2023

(87) PCT Pub. No.: WO2022/199840
PCT Pub. Date: Sep. 29, 2022

(65) Prior Publication Data
US 2024/0159199 A1 May 16, 2024

(51) Int. Cl.
*F02F 1/42* (2006.01)
*F02M 35/10* (2006.01)

(52) U.S. Cl.
CPC ...................................... *F02F 1/42* (2013.01)

(58) Field of Classification Search
CPC .. F02F 1/42; F02F 1/4235; F02F 1/425; F02F 2001/4207; F02M 35/10; F02M 35/10072; F02M 35/10091; F02M 35/10118; F02M 35/10124; F02M 35/1015
See application file for complete search history.

(56) References Cited

U.S. PATENT DOCUMENTS 4,699,104 A * 10/1987 Okumura .............. F02B 31/082 123/188.14
11,136,914 B2 * 10/2021 Lindgren .............. F02B 31/085
2009/0007860 A1 * 1/2009 Kato .................... F02M 35/162 123/41.85
2020/0263642 A1 8/2020 Sperry et al.
2022/0112859 A1 * 4/2022 Kojima ................... F02F 1/425

FOREIGN PATENT DOCUMENTS

WO 2018158952 A1 9/2018

OTHER PUBLICATIONS

International Search Report and Written Opinion of the International Searching Authority for International application No. PCT/EP2021/057926 dated Dec. 3, 2021.

* cited by examiner

*Primary Examiner* — Grant Moubry
(74) *Attorney, Agent, or Firm* — Carlson, Gaskey & Olds, P.C.

(57) ABSTRACT

An air intake port (10) for a lean-burn gasoline engine (110) comprises an air inlet (14), two air outlets (15*a*, 15*b*), and an air channel connecting the air inlet (14) to the two air outlets (15*a*, 15*b*) and comprising an upstream common duct (11) and two downstream port legs (12*a*, 12*b*), the two downstream port legs (12*a*, 12*b*) branching off from the common duct (11) at a bifurcation point (13). A total cross section of the air intake port (10) gradually decreases between the air inlet (14) and the two air outlets (15*a*, 15*b*). A gradient of decrease of the total cross section is locally reduced in a region adjacent the bifurcation point (13).

20 Claims, 3 Drawing Sheets

AIR INTAKE PORT FOR A LEAN-BURN GASOLINE ENGINE

TECHNICAL FIELD

The present disclosure relates to an air intake port for a lean-burn gasoline engine, to a lean-burn gasoline engine and to a vehicle with such an engine.

BACKGROUND

In classic internal combustion engines, gasoline burns best when it is mixed with air in the proportions of 14.7:1 (lambda=1). Most modern gasoline engines used in vehicles tend to operate at or near this so-called stoichiometric point for most of the time. Ideally, when burning fuel in an engine, only carbon dioxide (CO2) and water (H2O) are produced. In practice, the exhaust gas of an internal combustion engine also comprises significant amounts of carbon monoxide (CO), nitrogen oxides ($NO_x$) and unburned hydrocarbons. It is desirable to increase fuel efficiency and reduce unwanted emissions.

One possible route for increasing fuel efficiency is to burn the fuel with an excess of air. Burning fuel in such an oxygen-rich environment is usually called lean-burning. Typical lean-burn engines may mix air and fuel in proportions of, for example, 20:1 (lambda>1.3) or even 30:1 (lambda>2). Advantages of lean-burn engines include, for example, that they produce lower levels of CO2 and hydrocarbon emissions by better combustion control and more complete fuel burning inside the engine cylinders. The engines designed for lean burning can employ higher compression ratios and thus provide more efficient fuel use and lower exhaust hydrocarbon emissions than conventional gasoline engines. Additionally, lean-burn modes help to reduce throttling losses, which originate from the extra work that is required for pumping air through a partially closed throttle. When using more air to burn the fuel, the throttle can be kept more open when the demand for engine power is reduced.

Lean burning of fuel does, however, also come with some technical challenges that have to be overcome to provide an engine that is suitable and optimised for efficiently burning hydrocarbons in an oxygen-rich environment. For example, if the mixture is too lean, the engine may fail to combust. At low loads and engine speeds, reduced flammability may affect the stability of the combustion process and introduce problems with engine misfire. A lower fuel concentration also leads to less power output. Because of such disadvantages, lean burn is currently only used for part of the engine map and most lean-burning modern engines, for example, tend to cruise and coast at or near the stoichiometric point.

In order to enable the lean burning of fuel over a larger portion of the engine map, the engine needs to be designed in such a way to enable a large air flow into the combustion chamber and to ensure a reliable combustion process that will effectively burn all fuel, despite the oxygen rich conditions.

It is an aim of the present invention to provide an improved lean-burn engine.

SUMMARY OF THE INVENTION

Aspects and embodiments of the invention provide an air intake port for a lean-burn engine, a lean-burn engine and a vehicle with such an engine. The lean-burn engine may be suitable for use with gasoline as described herein. Alternatively or in addition thereto it will be appreciated that the lean-burn engine may be suitable for use with other fuels, such as hydrogen, for example. Aspects and embodiments of the invention are defined in the context of lean-burn gasoline but it will be appreciated that the fuel type can be substituted.

According to an aspect of the present invention there is provided an air intake port for a lean-burn gasoline engine, the air intake port comprising an air inlet, two air outlets, and an air channel connecting the air inlet to the two air outlets and comprising an upstream common duct and two downstream port legs, the two downstream port legs branching off from the common duct at a bifurcation point. The terms upstream and downstream are herein used to refer to parts of the air intake port relative to flow of air through the air intake port in its normal use with a lean-burn gasoline engine. The predominant air flow direction is from an upstream position to a downstream position. It follows that in normal use the engine is downstream of the air intake port. A total cross section of the air intake port gradually decreases between the air inlet and the two air outlets. A gradient of decrease of the total cross section is locally reduced in a region adjacent the bifurcation point.

Known air intake ports are seen to have a decreasing cross section profile in order to accelerate the air while flowing towards the combustion chamber and thereby increasing the total volume of air drawn through the air intake port. However, such air intake ports are generally designed such that the cross section decreases with a constant or approximately constant gradient of decrease. The inventors have found that this common approach is not optimal for use with a lean-burn gasoline engine, which requires a relatively high air intake volume and may be more dependent on a precise control of the direction of flow of the intake air at the point where it enters the combustion chamber. By introducing a local reduction of the gradient of decrease of the total cross section in the region around the bifurcation point, any possible disturbance of the air flow caused by the splitting and deflecting of the air flow is minimised. Preferably, the local reduction of the gradient of decrease of the total cross section is realised in the region immediately upstream and downstream of the bifurcation point, but the desired flow enhancing effect is at least partly achieved when reducing the gradient of decrease at only one side of the bifurcation point.

The air channel has an average gradient of decrease of the total cross section along the length of the air channel. The optimal average gradient will usually be a compromise between different design considerations. One possible constraint is the desired maximum speed of the air flow at the entrance of the combustion chamber. Too high speeds may lead to excessive NVH (noise, vibration, and harshness) problems and to choking of the port flow. Cylinder size and space constraints may define the maximum cross section of the air outlets of the air intake port. Given a maximum cross section and air flow speed at the outlet, an optimum average gradient of decrease of the total cross section can be established. Further constraints on the length and width of the air intake port may also play a role when determining the optimum. In preferred embodiments, the gradient of decrease of the total cross section may, for example, be locally at least 15% or 20% below the average gradient of decrease in at least a portion of the region adjacent the bifurcation point. In other embodiments, the gradient of decrease at that position may even be more than 25%, 30%, 35%, 40%, 45%, or 50% below the average gradient of decrease of the total cross section.

Optionally, the gradient of decrease of the total cross section is approximately zero in at least a portion of the region adjacent the bifurcation point. In this embodiment, the cross section of the air intake port remains substantially constant in the region around the bifurcation point, thereby allowing the air flow to move through undisturbed. In some embodiments, the gradient of decrease of the total cross section may even be locally below zero in at least a portion of the region adjacent the bifurcation point, which means that the cross section locally increases in the region around the bifurcation point.

Preferably, the gradient of decrease of the total cross section increases downstream of the region adjacent the bifurcation point. As soon as the air flow is properly split in two branches, the cross section can be decreased again in order to further increase the air flow.

In a further embodiment, the gradient of decrease of the total cross section may be locally reduced in the region immediately upstream of the two air outlets. The air outlets of the air intake port connect to the air inlets of the combustion chamber. Like near the bifurcation point of the air intake port, there may be a risk of undesired flow disturbances when the air flow reaches the intake valves and the transition point between the air intake port and the combustion chamber. To minimise such disturbances, it may be preferred to bring the gradient of decrease of the total cross section down to or below zero in the region immediately upstream of the air outlets.

According to another aspect of the invention a lean-burn gasoline engine is provided comprising at least one air intake port as described above. While the air intake port described herein is primarily designed for use with combustion chamber having a dual intake, it could be used to serve two single intake combustion chambers too.

According to yet another aspect of the invention, a vehicle is provided comprising a lean-burn gasoline engine with an air intake port as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
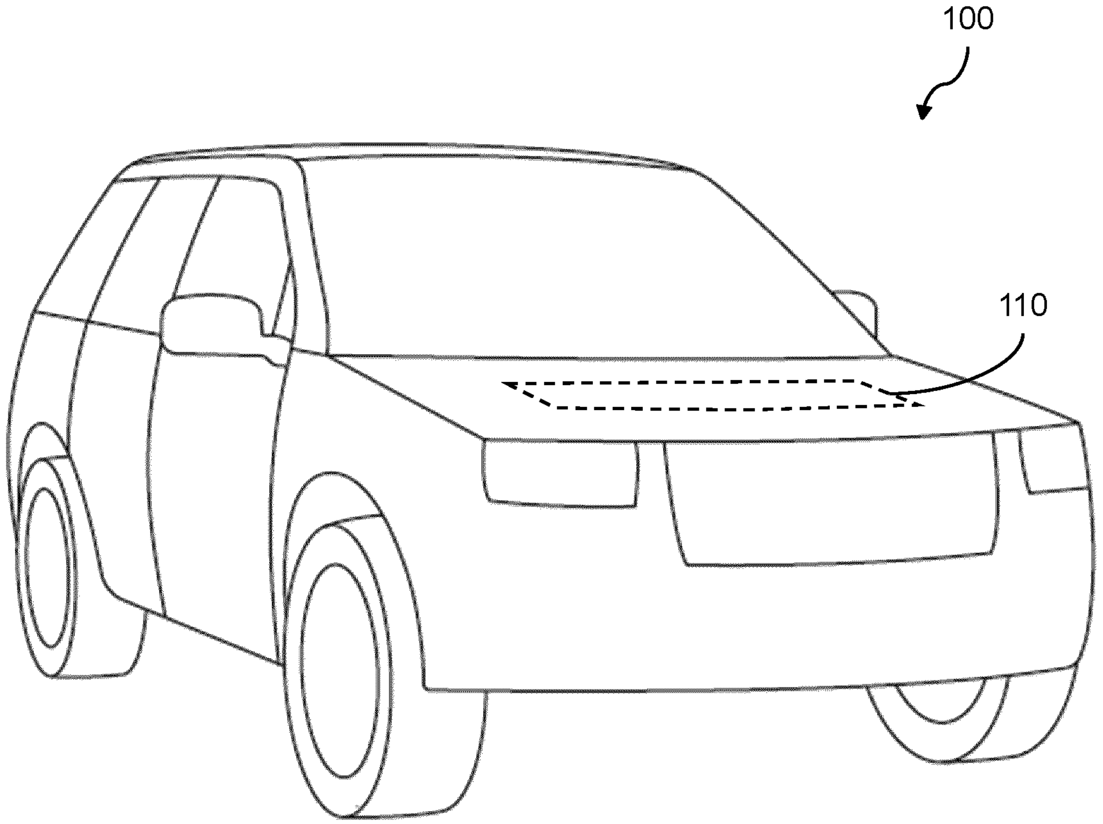
FIG. 1 shows a vehicle in which the invention may be used.

FIG. 1 shows a vehicle 100 in which the invention may be used. In this example, the vehicle 100 is a car, but the invention is equally applicable to other vehicles driven by a lean-burn gasoline engine 110. As mentioned above, it is to be noted that air intake port according to the invention and as described herein can be advantageously used in engines burning other fuels or fuel mixtures than gasoline. For example, the air intake port would be useful in a hydrogen burning internal combustion engine. In this vehicle 100, the lean-burn gasoline engine 110 is positioned in the front and coupled to a drivetrain to drive the front and/or rear wheels of the vehicle 100. The energy needed for driving the vehicle 100 is provided by burning fuel in the engine's cylinders causing the cylinder pistons to drive a crankshaft that is mechanically connected to the vehicle's drivetrain.

Compared to classic internal combustion engines, the lean-burn engine 110 of this vehicle 100 burns the fuel with an excess of air in the air-fuel mixture. Lean-burn engines may mix air and fuel in proportions of, for example, 20:1 (lambda>1.3) or even 30:1 (lambda>2). Advantages of lean-burn engines include more efficient fuel use and lower exhaust hydrocarbon emissions than conventional gasoline engines.

In order to enable the lean burning of fuel over a large portion of the engine map, i.e. in a large range of different engine speeds as well as engine output power or torque, the engine 110 is designed in such a way to enable a large air flow into the combustion chamber and a good mixing with the relatively small amount of fuel that is to be burnt to ensure a reliable combustion process that will effectively burn all fuel, despite the oxygen rich conditions.

Figure 2:
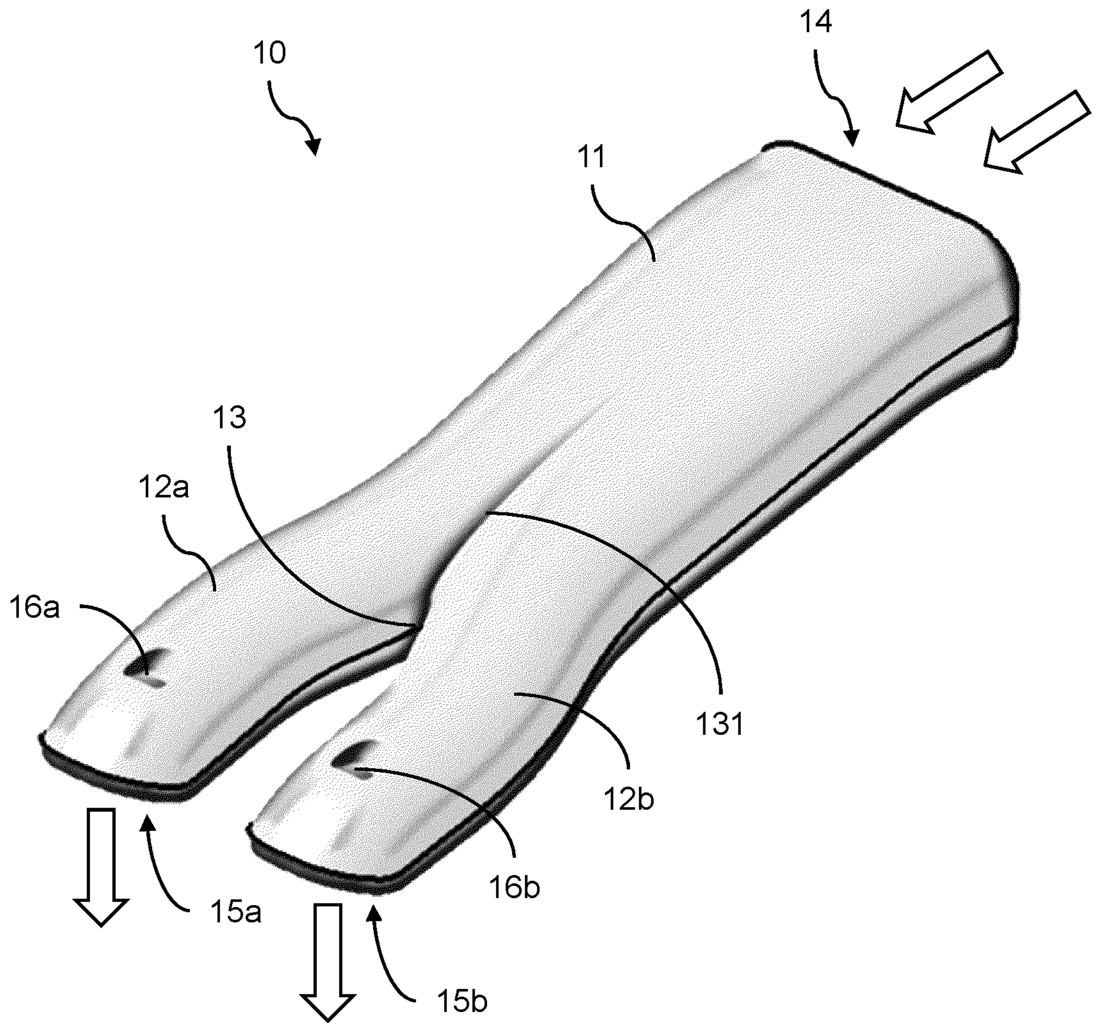
FIG. 2 shows an air intake port according to an embodiment of the invention.

FIG. 2 shows an air intake port 10 according to an embodiment of the invention. The air intake port 10 has an air inlet 14 and two air outlets 15*a*, 15*b*. An air channel connects the air inlet 14 to the two air outlets 15*a*, 15*b*. The first, upstream portion of the air channel, starting at the air inlet 14 forms a common duct 11. Ata bifurcation point 13, at a downstream end of the common duct 11, the common duct 11 branches off in two port legs 12*a*, 12*b* that provide the two respective air outlets 15*a*, 15*b*. The terms upstream and downstream are used to refer to parts of the air intake port 10 relative to flow of air through the air intake port 10 in its normal use with a lean-burn gasoline engine 110. The predominant air flow direction is from an upstream position to a downstream position. It follows that in normal use the engine 110 is downstream of the air intake port 10. The air outlets 15*a*, 15*b* are configured to connect to two respective inlets of the combustion chamber. Near the downstream ends of the port legs 12*a*, 12*b*, two valve guides 16*a*, 16 are provided, each being configured to receive a valve stem that is used for controlling the valve that selectively opens and closes the combustion chamber inlets.

Figure 3:
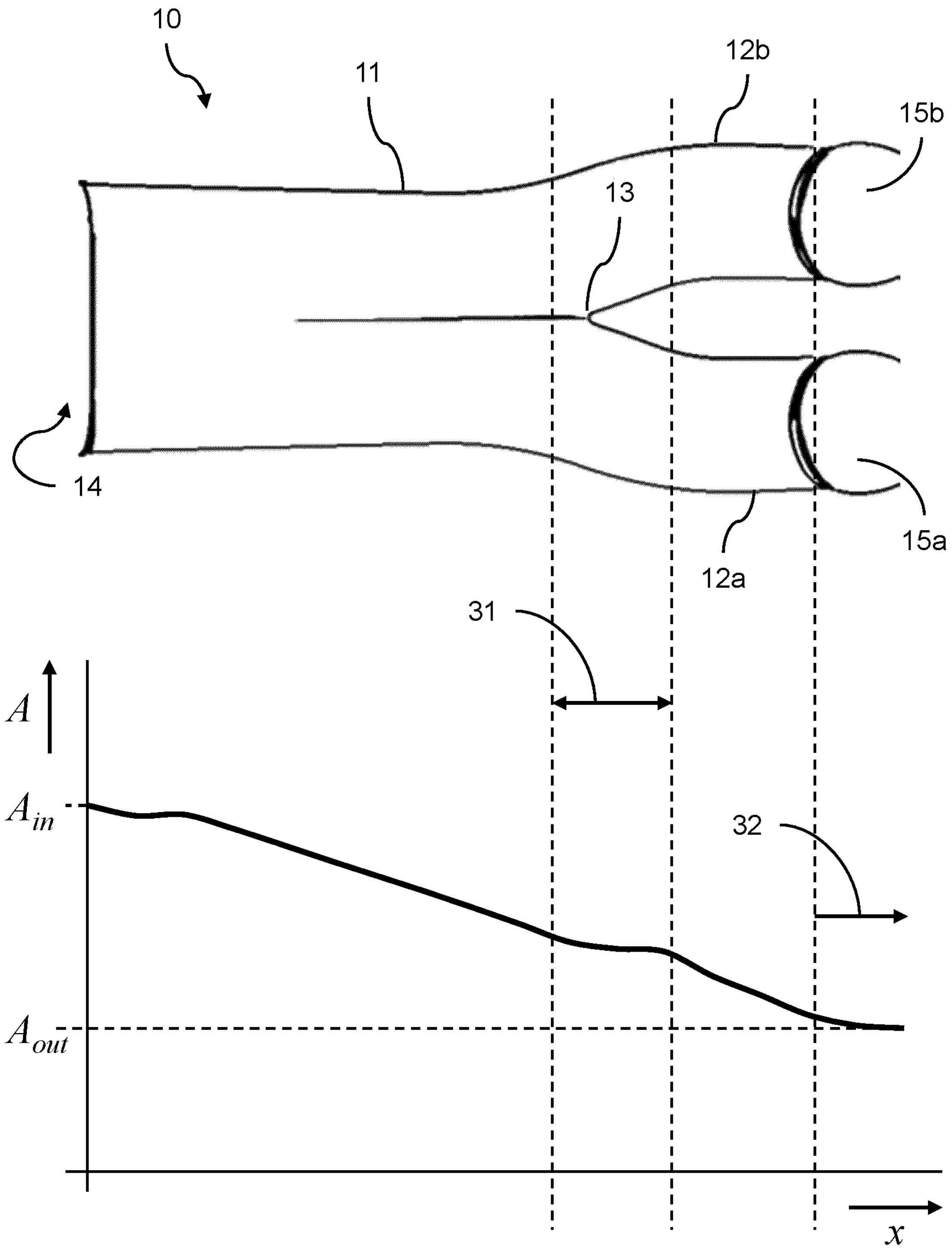
FIG. 3 schematically shows a bottom view of the air intake port of FIG. 2, together with a diagram indicating the cross section at different positions along its length.

FIG. 3 schematically shows a bottom view of the air intake port 10 of FIG. 2 together with a diagram indicating the cross section at different positions along its length. In addition to what has already been shown in and described with reference to FIG. 2, the bottom view also shows the air outlets 15*a*, 15*b*. As can be seen in the diagram, the total cross section of the air intake port 10 gradually decreases from $A_{in}$ at the air inlet to $A_{out}$ at the two air outlets. $A_{in}$ therein is the cross section at the start of the common duct and $A_{out}$ is the sum of the cross sections at the end of the two port legs 12*a*.12*b*. The decrease of the cross section does not follow a simple continuous and linear profile but is specifically designed to provide optimal air flow conditions with an aim to provide an undisturbed, high speed and high-volume flow of air at the outlets 15*a*, 15*b* of the air intake port 10. It is noted that, if the common duct 11 and the leg ports 12*a*, 12*b* are tubular or have a constant height-width ratio, the change in cross-section size may alternatively be visualised by showing the development of the radius, height, or width between the air inlet 14 and the air outlets 15*a*, 15*b*. Even though the overall profile of the cross section does not follow a linear pattern, the cross section may decrease linearly over parts of the common duct 11 and or the port legs 12*a*, 12*b*. This may particularly happen in sections where, e.g., the width of the common duct 11 or leg ports 12*a*, 12*b* is kept constant while the height decreases linearly (or vice versa).

As can be seen in the diagram, the gradient of decrease of the total cross section is locally reduced in a region 31 adjacent the bifurcation point 13. The inventors have found that by introducing this local reduction of the gradient of decrease of the total cross section in the region 31 around the bifurcation point 13, any possible disturbance of the air flow caused by the splitting and deflecting of the air flow is minimised. Preferably, the local reduction of the gradient of decrease of the total cross section is realised in the region immediately upstream and downstream of the bifurcation point 13, but the desired flow enhancing effect is at least partly achieved when reducing the gradient of decrease at only one side of the bifurcation point 13.

The air channel has an average gradient of decrease of the total cross section. The optimal average gradient will usually be a compromise between different design considerations. One possible constraint is the desired maximum speed of the air flow at the entrance of the combustion chamber. Too high speeds may lead to excessive NVH (noise, vibration, and harshness) problems and to choking of the port flow. Cylinder size and space constraints may define the maximum cross section of the air outlets of the air intake port. Given a maximum cross section and air flow speed at the outlet, an optimum average gradient of decrease of the total cross section can be established. Further constraints on the length and width of the air intake port may also play a role when determining the optimum. In preferred embodiments, the gradient of decrease of the total cross section may, for example, be locally at least 20% below the average gradient of decrease in at least a portion of the region adjacent the bifurcation point. In other embodiments, the gradient of decrease at that position may even be more than 25%, 30%, 35%, 40%, 45%, or 50% below the average gradient of decrease of the total cross section.

Optionally, like in the embodiment shown in FIG. 3, the gradient of decrease of the total cross section is locally about zero in at least a portion of the region 31 adjacent the bifurcation point 13. In this embodiment, the cross section of the air intake port 10 remains substantially constant in the region around the bifurcation point, thereby allowing the air flow to move through undisturbed. In some embodiments, the gradient of decrease of the total cross section may even be locally below zero in at least a portion of the region 31 adjacent the bifurcation point 13, which means that the cross section locally increases in the region 31 around the bifurcation point 13.

Preferably, the gradient of decrease of the total cross section increases downstream of the region adjacent the bifurcation point 13. As soon as the air flow is properly split in two branches 12*a*, 12*b*, the cross section can be decreased again in order to further increase the air flow.

In the embodiment shown in FIG. 3, the gradient of decrease of the total cross section is locally reduced in the region 32 immediately upstream of the two air outlets too. The air outlets 15*a*, 15*b* of the air intake port 10 connect to the air inlets of the combustion chamber. Like near the bifurcation point 13 of the air intake port 10, there may be a risk of undesired flow disturbances when the air flow reaches the intake valves and the transition point between the air intake port 10 and the combustion chamber. To minimise such disturbances, it may be preferred to bring the gradient of decrease of the total cross section down to or below zero in the region 32 immediately upstream of the air outlets 15*a*, 15*b*.

It will be appreciated that various changes and modifications can be made to the present invention without departing from the scope of the present application.

The invention claimed is:

1. An air intake port for a lean-burn gasoline engine, the air intake port comprising:

an air inlet, two air outlets, and an air channel connecting the air inlet to the two air outlets and comprising an upstream common duct and two downstream port legs, the two downstream port legs branching off from the common duct at a bifurcation point, wherein a total cross section of the air intake port gradually decreases between the air inlet and the two air outlets, and wherein a gradient of decrease of the total cross section is locally reduced in a region adjacent the bifurcation point.

2. An air intake port according to claim 1, wherein the air channel has an average gradient of decrease of the total cross section and wherein the gradient of decrease of the total cross section is locally at least 20% below the average gradient of decrease in at least a portion of the region adjacent the bifurcation point.

3. An air intake port according to claim 2, wherein the air channel has an average gradient of decrease of the total cross section and wherein the gradient of decrease of the total cross section is locally at least 40% below the average gradient of decrease in at least a portion of the region adjacent the bifurcation point.

4. An air intake port according to claim 1, wherein the gradient of decrease of the total cross section is approximately zero in at least a portion of the region adjacent the bifurcation point.

5. An air intake port according to claim 4, wherein the gradient of decrease of the total cross section is below zero in at least a portion of the region adjacent the bifurcation point.

6. An air intake port according to claim 1, wherein the gradient of decrease of the total cross section increases downstream of the region adjacent the bifurcation point.

7. An air intake port according to claim 1, wherein the gradient of decrease of the total cross section is locally reduced in the region immediately upstream of the two air outlets.

8. An air intake port according to claim 1, wherein the air channel has an average gradient of decrease of the total cross section and wherein the gradient of decrease of the total cross section is locally at least 20% below the average gradient of decrease in at least a portion of the region adjacent the bifurcation point, and wherein the gradient of decrease of the total cross section is approximately zero in at least a portion of the region adjacent the bifurcation point.

9. An air intake port according to claim 1, wherein the air channel has an average gradient of decrease of the total cross section and wherein the gradient of decrease of the total cross section is locally at least 40% below the average gradient of decrease in at least a portion of the region adjacent the bifurcation point, and wherein the gradient of decrease of the total cross section is approximately zero in at least a portion of the region adjacent the bifurcation point.

10. An air intake port according to claim 1, wherein the air channel has an average gradient of decrease of the total cross section and wherein the gradient of decrease of the total cross section is locally at least 20% below the average gradient of decrease in at least a portion of the region adjacent the bifurcation point, and wherein the gradient of decrease of the total cross section increases downstream of the region adjacent the bifurcation point.

11. An air intake port according to claim 1, wherein the air channel has an average gradient of decrease of the total cross section and wherein the gradient of decrease of the total cross section is locally at least 20% below the average gradient of decrease in at least a portion of the region adjacent the bifurcation point, and wherein the gradient of decrease of the total cross section is locally reduced in the region immediately upstream of the two air outlets.

12. An air intake port according to claim 1, wherein the gradient of decrease of the total cross section is approximately zero in at least a portion of the region adjacent the bifurcation point, and wherein the gradient of decrease of the total cross section increases downstream of the region adjacent the bifurcation point.

13. An air intake port according to claim 1, wherein the gradient of decrease of the total cross section is approximately zero in at least a portion of the region adjacent the bifurcation point, and wherein the gradient of decrease of the total cross section is locally reduced in the region immediately upstream of the two air outlets.

14. A lean-burn gasoline engine comprising at least one air intake port according to claim 1.

15. A vehicle comprising a lean-burn gasoline engine according to claim 14.

16. A lean-burn engine comprising at least one air intake port according to claim 1.

17. An air intake port for a lean-burn engine, the air intake port comprising:

an air inlet, two air outlets, and an air channel connecting the air inlet to the two air outlets and comprising an upstream common duct and two downstream port legs, the two downstream port legs branching off from the common duct at a bifurcation point, wherein a total cross section of the air intake port remains substantially constant in a region adjacent the bifurcation point.

18. An air intake port according to claim 17, wherein the total cross section of the air intake port gradually decreases between the air inlet and the two air outlets, and wherein the gradient of decrease of the total cross section increases downstream of the region adjacent the bifurcation point.

19. An air intake port according to claim 17, wherein the total cross section of the air intake port gradually decreases between the air inlet and the two air outlets, and wherein the gradient of decrease of the total cross section is locally reduced in the region immediately upstream of the two air outlets.

20. A lean-burn engine comprising at least one air intake port according to claim 17.

* * * * *